3,667,905
CONTINUOUS PRODUCTION OF ALUMINIUM SULPHATE
George H. Jennings, 23 Crimea St., St. Kilda, Victoria, Australia
No Drawing. Filed July 29, 1970, Ser. No. 59,325
Claims priority, application Australia, Aug. 6, 1969, 59,156/69
Int. Cl. C01f 7/00
U.S. Cl. 23—123            6 Claims

ABSTRACT OF THE DISCLOSURE

A continuous process for the production of aluminium sulphate, either as alum crystals or alum solutions in commercial concentrations at ambient temperature, in which sulphuric acid at concentrations of 20–100% and dry alumina hydrate or bauxite or other form of aluminium hydroxide, together with diluent feed water as may be required depending upon the concentration of the sulphuric acid used, are separately fed to the inlet of a multi-pass heat-exchange tubular reactor, the mixture of reactants being at a temperature of 70–120° C. when fed into said reactor and being rapidly brought to a temperature of 110–120° C. after entering said reactor and being maintained at a temperature of 110–120° C. in traversing said reactor to the outlet.

---

This invention relates to the production of aluminium sulphate and provides a continuous process in which there can be produced an aluminium sulphate product which at ambient temperature ranges from solid $Al_2(SO_4)_3.14$ (approx.) $H_2O$ crystals to an approximately 50% aqueous solution of said crystals, the equipment and processing technique employed in the process of the invention minimizing capital and labour costs.

Aluminium sulphate is widely produced by a batch process reaction of sulphuric acid and alumina or bauxite or other form of aluminium hydroxide, in large digesters with a cycle time of about 3–6 hours and which have an operating time of not more than about 50%. This requires relatively oversized equipment to handle the loading and unloading or discharge of the end-product in a comparatively short period of time. Moreover considerable equipment space is required as well as considerable manhandling of products formed during this process. Substantial labour costs are incurred in the process as a result.

Continuous processes for the production of aluminium sulphate by reaction of sulphuric acid and alumina or bauxite or other such feed are known and include (a) a so-called "batch" continuous process; (b) a so-called "pressure" continuous process; and (c) a so-called "rotating drum" continuous process. In the first of these so-called continuous processes, the digestion is carried out in two or more parallel kettle digestors. This has the disadvantage of the normal batch process in regard to waste space, labour, time and equipment oversize for loading and unloading. The process requires the use of sulphuric acid of 65–75% concentration, external heating being required if the acid strength is below this, whilst if the acid concentration is above 65–75% the reaction can be almost explosive on occasions. In the second of these processes, the reactants are fed into the reactor under positive pressure, no mention being made of temperature control, the flow direction of materials, or the proportions of materials or end-products. This process would permit a higher reaction temeprature and thus would have a reduced reaction time, however the process has the disadvantage of requiring special equipment to handle and inject powdered alumina and corrosive sulphuric acid under pressure into the reactor. In the third of these processes the mixing of powdered or finely-divided aluminium-source feed material is mixed with sulphuric acid in a horizontally inclined, rotating drum. This process is believed to work satisfactorily only when using as the source of aluminium ion, a bauxiate suitably treated so as to be sufficiently reactive under these conditions. The result is a granular product containing in the end-products the impurities of the mined and calcined bauxite.

The present invention provides a continuous process for the production of aluminium sulphate, utilizing highly efficient equipment for the purpose, in which in general sulphuric acid at concentrations from 20–100% and dry alumina hydrate or other form of aluminium hydroxide are separately fed into a multi-pass heat-exchange reactor at inlet temperatures from 70° C. to 120° C. The reaction temperature of the sulphuric acid and aluminum hydroxide source is controlled by the heat-exchange reactor, whilst the residence time related to flow rate is determined by the concentration of the sulphuric acid feed. The process of the invention is capable of producing solid alum crystals or alum solutions in commercial concentrations at ambient temperature, whilst production costs are estimated to be in the order of 10–20% lower than costs in known processes of comparable production rates.

In accordance with the present invention there is provided a process for the continuous production of aluminium sulphate in which sulphuric acid of 20–100% concentration is reacted with alumina hydrate or bauxite or other suitable form of aluminium hydroxide, which comprises continuously feeding the sulphuric acid and alumina hydrate or other such reactant separately to the inlet of a multi-pass countercurrent/concurrent heat-exchanging reactor, together with diluent feed water as may be required depending upon the initial concentration of the sulphuric acid feed component; controlling the concentration/temperature of the sulphuric acid/water feed and the amounts of sulphuric acid and alumina hydrate or other such reactant so that when the sulphuric acid is contacted with the alumina hydrate or other such reactant at the reactor inlet, the resultant mixture has a temperature within the range of 70–120° C. and provides sulphate ions and aluminium ions in aqueous solution in stoichiometric or approximately stoichiometric proportions; controlling the feed-rate and flow-rate of said sulphuric acid and alumina hydrate or other such reactant into and through said reactor so that the temperature of said mixture is rapidly brought to and maintained substantially at its boiling point, i.e. brought to and maintained at a temperature within the range of 110–120° C. within about one-half to ten seconds of entry of the said mixture into the inlet of said reactor; and continuously discharging at the reactor outlet a reaction product which at ambient temperature ranges from solid $Al_2(SO_4)_3.14$ (approx.) $H_2O$ crystals to an approximately 50% aqueous solution of said crystals.

Calcined bauxite, which is a relatively highly reactive form of aluminium hydroxide, may be used in operating the process of the invention, however the process can be equally well operated with less reactive forms of aluminium hydroxide, such as mined bauxite or alumina hydrate, whilst other forms of aluminium hydroxide which may be used in the process of the invention include aluminium anodizer sludge.

When sulphuric acid feed material having a concentration of 20–25% is used in the process of the invention, such feed material is heated to a temperature in the order of 90–108° C. preparatory to admixture with the alumina hydrate or other such feed material for immediate entry of the mixture into the inlet of the multi-pass heat-exchanging reactor. Sulphuric acid feed material of a concentration of 20–25% can be conveniently used for the production of an essentially 50% aqueous solution of the $Al_2(SO_4)_3.14$–$18\ H_2O$ crystals at ambient temperature.

When a sulphuric acid feed material having a concentration in the order of 50% is used in the process of the invention, such feed material is heated to a temperature in the order of 70–120° C. for admixture with the alumina hydrate or other such feed material as indicated. Sulphuric acid feed material of a concentration in the order of 50% can be conveniently used for the production of solid crystalline aluminium sulphate, $Al_2(SO_4)_3.14$–$18\ H_2O$ at ambient temperature.

When a sulphuric acid feed material having a concentration in the order of 90–100% is used in the process of the invention, such feed material is diluted with water in being admixed with the alumina hydrate or other such feed material, in order to provide essentially the water of crystallization for the production of solid crystalline $Al_2(SO_4)_3.14$–$18\ H_2O$ at ambient temperature. In this case the heat of dilution will generally raise the temperature of the admixture to a temperature in the order of 70–120° C., the water preferably being cold and if necessary the mixture of feed materials being cooled, depending upon the amount of heat liberated by dilution of the sulphuric acid.

The reactor is a multi-pass counter-current/concurrent heat exchanger in which the reaction is rapidly brought to the boiling point of the reactant solution and maintained substantially at this temperature by utilizing the heat released essentially in the initial stage of reaction, the reaction products progressively forming in various stages being kept physically separate from each other in traversing in the separate passes of the multi-pass reactor. After contacting the reactants at a temperature as specified above preparatory to feeding the reaction mixture to the inlet of the reactor, the various stages of the process which take place in the reactor include heating the reaction mixture to approximately the boiling point, controlling the excess heat liberated by the reaction, and maintaining the temperature of the reaction mixture at or close to the boiling point during its progress through the reactor to permit the reaction to come to practical completion.

For this purpose the multi-pass heat-exchange reactor employed in the process of the invention conveniently is a horizontally-disposed tubular heat-exchanger having an inlet connected to a control axial tube extending substantially the length of the reactor for entry and concurrent or initial-pass of the reaction mixture, said central axial tube communicating with a co-axial countercurrent tubular pass extending to the reactor outlet or communicating with multiple co-axial counter-current/concurrent tubular passes extending substantially the length of the reactor and finally to the reactor outlet. Thus the reactor may have 2, 3 or 4, or even more, communicating tubular passes for the reaction mixture, depending upon processing conditions and the required output of the reactor in terms of, for example, 1–4 tons/hour of end-product.

Mixing of the alumina hydrate or the like and sulphuric acid, together with any required water of dilution, conveniently takes place in a Y-extension tube selection at the inlet to the reactor. The sulphuric acid is conveniently fed into one leg of the Y-extension tube section, whilst the powdered alumina hydrate or like material, together with any water of dilution for the sulphuric acid, is conveniently fed into the other leg of the Y-extension tube section. These materials are either preheated to a temperature within the range of 70–120° C. before being fed to the Y-extension tube, or autogeneously heat to a temperature within this range through the heat liberated by dilution of the 90–100% sulphuric acid which may be used in the process of the invention, as indicated.

Control of the temperature of the sulphuric acid and alumina hydrate or like reactant so as to be in the range of 70–120° C. when fed as a mixture into the inlet of the multi-pass heat-exchanging reactor is an essential feature of the invention. When sulphuric acid of 90–100% concentration, for example, is used as the sulphuric acid feed material, the heat of dilution initially generated upon admixture with water raises the temperature of this feed material to the order of 70–120° C., as indicated. Feeding this material into the reactor inlet together with the alumina hydrate or like reactant, at the lower end of this temperature range, allows the heat liberated in the initial stage of reaction to be absorbed by the reaction mixture without adverse effect. In the event that the inlet temperature of the reactants was lower than 70° C., say by using a dilute feed acid and not preheating the material, then the heat used to bring the reaction mixture to a temperature in excess of 100° C. would cause aluminium sulphate inconveniently to crystallize out at the end of the second stage and onwards. An inlet temperature lower than 70° C. results in a low reaction rate in the early part of the first stage, which resulted in a product suffering from an unacceptable high acidity. A reduced production rate of a higher residence time could improve this condition, however the heat loss from the reactor may not make it possible to maintain the required temperature in the later stages for the completion of the reaction without supplementary heating.

Stoichiometric quantities of aluminium ions and sulphate ions are required for a commercially satisfactory product, with the proviso that a slight excess of aluminium ions can be present to ensure more rapid completion of reaction near the end when sulphuric acid concentration is low. When excess alumina hydrate or like reactant is used for this purpose, it can be recovered for re-use by filtering the hot, liquid product from the reactor outlet before cooling and crystallizing, in the case when the product is alum in crystalline form.

Solid crystalline $Al_2(SO_4)_3.18\ H_2O$ can be produced from a feed consisting of 0.155 lb. alumina hydrate (calculated as $Al_2O_3$) and 0.441 lb. sulphuric acid (calculated as 100% acid) plus $x$ lb. of water of dilution and 0.404 lb. of water minus $x$ lb. of water for each 1 lb. of solid crystalline $Al_2(SO_4)_3.18\ H_2O$. The inlet temperature to the reactor should be between 70–90° C., achieved by heat of dilution, or by external heating, the latter being conveniently obtained from cooling the end-product for crystallization. A feed temperature below 70° C. would have resulted in a lowered production rate whilst a feed temperature above 105° C. would have produced a violent steam evolution in the first stage of the reactor, resulting in a solid deposition of alumina hydrate/aluminium sulphate in the reactor.

A 50% solution of $Al_2(SO_4)_3.18\ H_2O$ crystals can be produced from a feed consisting of 0.0763 lb. alumina hydrate and 0.22 lb. sulphuric acid (calculated as 100% acid) plus x lb. water of dilution and 0.701 lb. of water minus $x$ lb. of water for each 1 lb. of 50% solution of crystalline aluminium sulphate. In this instance the inlet temperature is higher, desirably about 100° C., as some of the heat otherwise required for reaction is used in heating the additional amount of water present in the system. A temperature lower than 100° C. substantially increases the time for the reaction and usually results in a poor quality product. A preferred alternative is to dilute a hot solution of alum which would yield $Al_2(SO_4)_3.14$ (approx.) $H_2O$ at ambient temperature, when leaving the reactor, however this is practical only when using a feed sulphuric acid concentration in excess of 50%. The final amounts of the feed components remain the same regardless of where they are introduced.

In a 2-pass tubular heat-exchange reactor producing 24.5 lbs. of $Al_2(SO_4)_3.18\ H_2O$ crystals/hour (or 49 lbs. of 50% solution/hour of said crystals), according to the invention, the reaction starting time can be in the order of 40–70 seconds. In a 3-pass tubular heat-exchange reactor producing 113 lbs. of $Al_2(SO_4)_3.18\ H_2O$ crystals/ hour (or 226 lbs. of 50% solution/hour of said crystals), according to the invention, the reaction starting time can be in the order of 5–20 seconds.

A 4-pass tubular heat-exchange reactor capable of producing 1 ton/hour of $Al_2(SO_4)_3.18\ H_2O$ crystals (or 2 tons/hour of a 50% solution of said crystals), according to the invention, would be approximately 9" outside diameter and approximately have an overall tubular-pass length of 10–15', whilst a 4-pass tubular heat-exchange reactor capable of producing 4 tons/hour of $Al_2(SO_4)_3.18\ H_2O$ crystals (or 8 tons/hour of a 50% solution of said crystals), would be approximately 20" outside diameter and an overall tubular-pass length of approximately 15–20', and require a ¼–½ H.P. drive for the alumina or bauxite or like feed component. In comparison, a batch reactor of the prior art would be approximately 6–8' in diameter and 12–15' high; require 1–2 men to load and unload the reactor; require a 1–5 H.P. drive for the stirrer; require equipment and floor space to cool 4–8 tons of product and handle discharge of this quantity of material in 30–60 minutes, in giving an average production rate of a ½–1½ tons/hour of crystals.

Residence time of the reaction mixture in the multi-pass heat-exchange reactor in accordance with the invention varies with the size of the reactor. Although a residence time of 1–4 minutes, e.g. 1–1.5 minutes or 3–4 minutes residence time, can be employed in reactors producing relatively small quantities of end-product, the residence time for example for a 1 ton/hour output of said crystals would be in the order of 4–6 minutes, whilst the residence time for example for a 4 tons/hour output of said crystals would be in the order of 4–8 minutes. In a 3-pass reactor operating under preferred conditions, i.e. with an inlet temperature for the reactants of 70–80° C. and a reaction mixture temperature of 105–120° C. at the end of the first stage and with up to a 1% excess of alumina reactant, which excess is recovered by filtration for reuse, and an overall tubular-pass length of about 10–15', the minimum residence time would be 4–6 minutes. An increase in the overall tubular-pass length of the reactor to about 20' would result in a minimum residence time of about 8 minutes and improve the completeness of reaction under all conditions except in the case where an excess of sulphuric acid might be present and which must be avoided.

Under preferred operating conditions, the reactor-exit product is a solution at a temperature in the order of 100–105° C. and equivalent to $Al_2(SO_4)_3.14–18\ H_2O$ when at ambient temperature. Dilution of this solution for the production of say a 50% solution of the crystals at ambient temperature is preferred because direct production of such a solution in the reactor is only economic when waste dilute sulphuric acid is available. This is because the rate of production of $Al_2(SO_4)_3.14–18\ H_2O$ in the reactor is only about one-third to one-half that when producing a reactor outlet product suitable for cooling directly to the crystalline form of end-product.

The process of the invention is illustrated by the following non-limitative practical examples:

EXAMPLE 1

A mixture of alumina hydrate, sulphuric acid and water at feed rates of 0.2 ton/hour alumina hydrate, 0.385 ton/hour of sulphuric acid (95–98%) and 0.34 ton/hour of water was fed to the centre pass of a 4-pass tubular heat-exchange reactor of 12' overall length and 6" outside diameter. The temperature of the mixture at the reactor inlet to the centre pass was in the range of 105–110° C. The temperature of the reaction mixture rose to be within the range of 115–119° C. after entering the first pass of the reactor and remained in this temperature range until reaching the reactor outlet. The residence time of the reaction mixture in the reactor was about 4 minutes. A product of $Al_2(SO_4)_3.13.4\ H_2O$ was obtained at the production rate of 0.75 ton/hour.

EXAMPLE 2

A reaction mixture of alumina hydrate, sulphuric acid and water was fed to a 4-pass tubular heat-exchange reactor as in Example 1 except that the feed rates were 0.136 ton/hour of alumina hydrate, 0.261 ton/hour of sulphuric acid (95–98%) and 0.42 ton/hour of water. The temperature of the mixture at the reactor inlet to the centre pass was in the range of 95–100° C. The temperature of the reaction mixture rose to be within the range of 110–112° C. after entering the first pass of the reactor and remained in this temperature range until reaching the reactor outlet. The residence time of the reaction mixture in the reactor was about 4 minutes. A product of $Al_2(SO_4)_3.30$ (approx.) $H_2O$ was obtained at the production rate of 0.78 ton/hour.

EXAMPLE 3

A mixture of alumina hydrate, sulphuric acid and water at feed rates of 0.348 ton/hour of alumina hydrate, 0.667 ton/hour of sulphuric acid (95–98%) and 0.56 ton/hour of water was fed to a 4-pass tubular heat-exchange reactor as in Example 1. The temperature of the mixture at the reactor inlet to the centre pass was in the range of 105–110° C. and rose to be within the range of 115–119° C. after entering the first pass of the reactor and remained in this temperature range until reaching the reactor outlet. The residence time of the reaction mixture in the reactor was about 1 minute. A product of $Al_2(SO_4)_3.13.3\ H_2O$ was obtained at the production rate of 1.3 tons/hour.

EXAMPLE 4

A reaction mixture of alumina hydrate, sulphuric acid and water was fed to a 4-pass tubular heat-exchange reactor as in Example 1 except that the feed rates were 0.252 ton/hour of alumina hydrate, 0.483 ton/hour of sulphuric acid (95–98%) and 0.74 ton/hour of water. The temperature of the mixture at the reactor inlet to the centre pass was in the range of 95–100° C. and rose to be within the range of 110–112° C. after entering the first pass of the reactor and remained in this temperature range until reaching the reactor outlet. The residence time of the reaction mixture in the reactor was about 1 minute. A product of $Al_2(SO_4)_3.30$ (approx.) $H_2O$ was obtained at the production rate of 1.4 tons/hour.

Examples 1–4 indicate that aluminum sulphate with a hydration varying from about 13.3 to 30 $H_2O$ can be obtained from a 4-pass tubular heat-exchange reactor of the dimensions set out in the examples at production rates of 0.75–1.4 tons/hour, utilizing 0.13–0.348 ton/hour of alumina hydrate, 0.261–0.667 ton/hour of sulphuric acid (95–98%), and 0.34–0.74 ton/hour of water. Alumina hydrate and sulphuric acid feed amounts are substantially stoichiometric however the sulphuric acid may be used in slightly less than stoichiometric amount, whilst the amount of feed water was in substantial excess to compensate for loss through steam evolution. The reaction mixture temperature at the reactor inlet was in the range of 95–110° C. whilst the temperature of the reaction mixture rose to be within the range of 110–119° C. after entering the first pass of the reactor and remained in this temperature range until reaching the reactor outlet. The residence time of the reaction mixture at the lower feed rate of 0.136–0.201 ton/hour alumina hydrate was in the order of 4 minutes whilst the residence time of the reaction mixture at the higher feed rate of 0.252–0.348 ton/hour alumina hydrate was reduced to be in the order of 1 minute due to expulsion by excess steam evolution developed in the reactor.

The invention thus provides a process for the production of aluminum sulphate in which the concentration of the sulphuric acid to be used in the process essentially governs the reaction conditions with relation to temperature of the reaction mixture when fed into the reactor, the temperature resulting either from heat of dilution or from heating of the reaction mixture before being fed into the reactor. The process also provides for the flow rate of the reaction materials in the reactor to be reduced so as to increase the residence time in the reactor in order to achieve a complete reaction if the temperature of the reactants at the reactor inlet is lower than the optimum. The process also provides for the metering of all materials into the reactor so as to produce an aluminum sulphate product having an acidity between predetermined limits and in which there is an acceptably low amount of insoluble-solids and water content in relation to industrial requirements. The process also provides for the continuous monitoring of the reactor-outlet product pH so as to keep the acidity within predetermined limits, as well as the continuous monitoring of the specific gravity. The process also provides for the removal of undissolved solids from the reactor-outlet product by filtration of said product, in which the filter is desirably heated to prevent premeature crystallization of said product in the filter, which is not ordinarily possible in either the batch process or the rotating drum process of the prior art, in that waste steam is not ordinarily available in such processes, in contrast to the present process. The process also provides for rapid establishment of desired reaction conditions and reaction stabilisation, after altering said conditions from time to time in producing different aluminum sulphate products. The process also provides for minimal labour requirements in that apart from periodic process checking, the labour required is substantially limited to bagging of the crystalline product or handling of the aqueous solutions of such product.

I claim:

1. A process for the continuous production of an aluminium sulphate product which ranges from solid $Al_2(SO_4)_3 \cdot 14$ to 18 $H_2O$ crystals to an approximately 50% aqueous solution of $Al_2(SO_4)_3 \cdot$ approx. 18 $H_2O$ crystals at ambient temperature, which comprises continuously feeding a source of aluminium hydroxide and sulphuric acid having a concentration of about 20% to about 50% separately to a combined multi-pass countercurrent-flow heat-exchange and reacting zone; controlling the concentration and temperature of the sulphuric acid and the amounts of sulphuric acid and the source of aluminium hydroxide so that when the sulphuric acid is contacted with the source of aluminium hydroxide at the reaction zone initially, the resultant mixture has a temperature within the range of 70–120° C. and provides sulphate ions and aluminium ions in said mixture in approximately stoichiometric proportions; controlling the feed rate and flow rate of said sulphuric acid and the source of aluminium hydroxide into and through said reaction zone so that said mixture is brought to a temperature within the range of 110–120° C. and is maintained within said temperature range in said heat-exchange zone for a reaction time of about 1 to 8 minutes; and continuously discharging from said reaction zone a reaction product which ranges from solid $Al_2(SO_4)_3 \cdot 14$ to 18 $H_2O$ crystals to an approximately 50% aqueous solution of $Al_2(SO_4)_3$ approx. 18 $H_2O$ crystals at ambient temperature.

2. The process defined in claim 1, wherein the sulphuric acid has a concentration of 20–25% and is heated to a temperature in the range of 90–108° C. preparatory to admixture with the source of aluminium hydroxide.

3. The process defined in claim 1, wherein the sulphuric acid has a concentration in the order of 50% and is heated to a temperature in the range of 70–120° C. preparatory to admixture with the source of aluminium hydroxide.

4. A process for the continuous production of an aluminium sulphate product which ranges from solid $Al_2(SO_4)_3 \cdot 14$ to 18 $H_2O$ crystals to an approximately 50% aqueous solution of $Al_2(SO_4)_3 \cdot 14$ to 18 $H_2O$ crystals at ambient temperature, which comprises continuously feeding a source of aluminium hydroxide and sulphuric acid having a concentration of about 50% to about 100% and diluent water feed separately to a combined multi-pass countercurrent-flow heat-exchange and reaction zone; controlling the concentration and temperature of the sulphuric acid/diluent water feed and the amounts of sulphuric acid and the source of aluminium hydroxide so that when the sulphuric acid/diluent water feed is contacted with the source of aluminium hydroxide at the reaction zone initially, the resultant mixture has a temperature within the range of 70–120° C. and provides sulphate ions and aluminium ions in said mixture in approximately stoichiometric proportions; controlling the feed rate and flow rate of said sulphuric acid/diluent water feed and the source of aluminium hydroxide into and through said reaction zone so that said mixture is brought to a temperature within the range of 110–120° C. and is maintained within said temperature range for a reaction time of about 1 to 8 minutes; and continuously discharging from said reaction zone a reaction product which ranges from solid $Al_2(SO_4)_3 \cdot 14$ to 18 $H_2O$ crystals to an approximately 50% aqueous solution of $Al_2(SO_4)_3 \cdot 14$ to 18 $H_2O$ crystals at ambient temperature.

5. The process defined in claim 4, wherein the sulphuric acid has a concentration of about 65 to about 100% and is mixed with the diluent water feed prior to being admixed with the source of aluminium hydroxide whereby the heat of dilution raises the temperature of the diluted sulphuric acid to a temperature in the range of 70–120° C.

6. A process for the continuous production of an aluminium sulphate product which ranges from solid $Al_2(SO_4)_3 \cdot 14$ to 18 $H_2O$ crystals to an approximately 50% aqueous solution of $Al_2(SO_4)_3 \cdot 14$ to 18 $H_2O$ crystals at ambient temperature, which comprises continuously feeding a source of aluminium hydroxide and sulphuric acid having a concentration of about 90% to about 100% and diluent water feed separately to a combined multi-pass countercurrent-flow heat-exchange and reaction zone, the diluent water fed being mixed with the sulphuric acid prior to being admixed with the source of aluminium hydroxide whereby the heat of dilution raises the temperature of the diluted sulphuric acid to a temperature in the range of 100–120° C.; controlling the concentration and temperature of the sulphuric acid/diluent water feed and the amounts of sulphuric acid and the source of aluminium hydroxide so that when the sulphuric acid/diluent water feed is contacted with the source of aluminium hydroxide at the reaction zone inlet, the resultant mixture has a temperature within the range of 100–120° C. and provides sulphate ions and aluminium ions in said mixture in approximately stoichiometric proportions; controlling the feed rate and flow rate of said sulphuric acid/diluent water feed and the source of aluminium hydroxide and through said reaction zone so that said mixture is brought to a temperature within the range of 110–120° C. and is maintained within said temperature range for a reaction time of about 1 to 8 minutes; and continuously discharging at the reaction zone outlet a reaction product which ranges from solid $Al_2(SO_4)_3 \cdot 14$ to 18 $H_2O$ crystals to an approximately 50% aqueous solution of $Al_2(SO_4)_3 \cdot 14$ to 18 $H_2O$ crystals at ambient temperature.

References Cited

UNITED STATES PATENTS

| | | | |
|---|---|---|---|
| 2,350,757 | 6/1944 | Tomlinson et al. | 23—123 |
| 1,604,427 | 10/1926 | Spicer | 23—123 X |
| 3,393,975 | 7/1968 | Mitchell et al. | 23—123 |
| 3,082,064 | 3/1963 | Brooksbank et al. | 23—123 |
| 2,211,805 | 8/1940 | Wilson et al. | 23—123 |

HERBERT T. CARTER, Primary Examiner